(12) United States Patent
Nasu

(10) Patent No.: US 8,069,312 B2
(45) Date of Patent: Nov. 29, 2011

(54) APPARATUS, CIRCUIT AND METHOD OF CONTROLLING MEMORY INITIALIZATION

(75) Inventor: Yasuyuki Nasu, Tokyo (JP)

(73) Assignee: NEC Corporation, Tokyo (JP)

( * ) Notice: Subject to any disclaimer, the term of this patent is extended or adjusted under 35 U.S.C. 154(b) by 576 days.

(21) Appl. No.: 12/292,139

(22) Filed: Nov. 12, 2008

(65) Prior Publication Data

US 2009/0187717 A1 Jul. 23, 2009

(30) Foreign Application Priority Data

Jan. 17, 2008 (JP) .................................. 2008-007616

(51) Int. Cl.
*G06F 12/00* (2006.01)
(52) U.S. Cl. ........................................................ 711/141
(58) Field of Classification Search .......................... None
See application file for complete search history.

(56) References Cited

U.S. PATENT DOCUMENTS 7,809,962 B2 * 10/2010 Chang et al. .................. 713/300

FOREIGN PATENT DOCUMENTS

JP 5-324453 12/1993

\* cited by examiner

*Primary Examiner* — Hiep Nguyen
(74) *Attorney, Agent, or Firm* — McGinn IP Law Group, PLLC

(57) ABSTRACT

An apparatus includes a first memory which includes a plurality of memory regions, a second memory which stores initializing information indicating whether each of the memory regions is initialized, the second memory controlling a coherency between the first memory and a cache memory, and a control circuit which initializes a memory region based on the initializing information when accessing the memory region.

15 Claims, 5 Drawing Sheets

Figure 1:
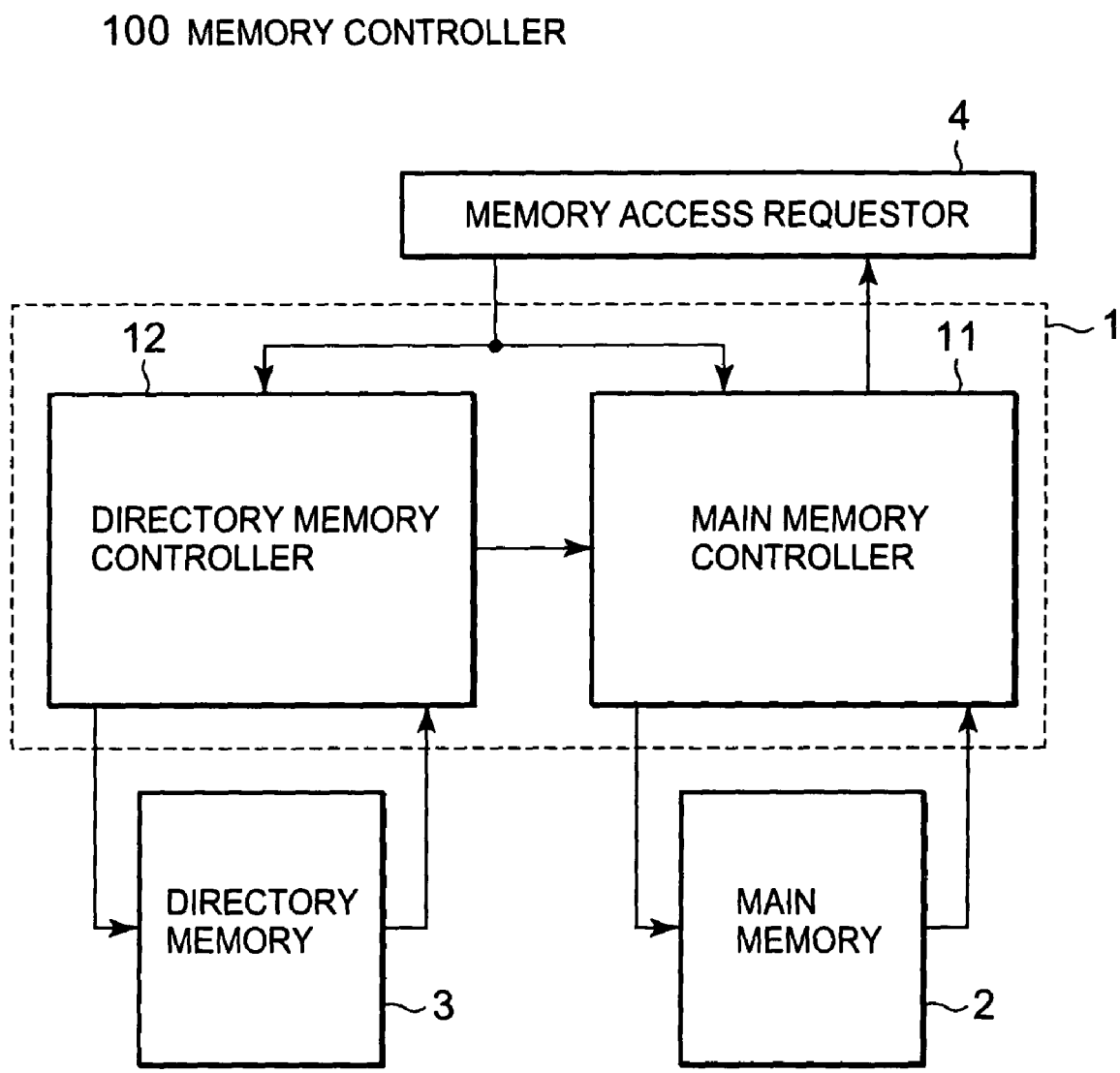

APPARATUS, CIRCUIT AND METHOD OF CONTROLLING MEMORY INITIALIZATION

INCORPORATION BY REFERENCE

This application is based upon and claims the benefit of priority from Japanese patent application No. 2008-007616, filed on Jan. 17, 2008, the disclosure of which is incorporated herein in its entirety by reference.

BACKGROUND OF THE INVENTION

1. Field of the Invention

The present invention relates to a memory controller, and more particularly to a memory controller that initializes a memory.

2. Description of Related Art

A computer including a main memory is required to be initialized by writing data with a correct ECC (Error Correcting Code) into the main memory during an initialization of the computer. If the main memory is not initialized with the data including the correct ECC, then the data is regarded as invalid data during a check by an ECC check circuit, when read from the main memory. Thus, a memory failure is reported inadvertently.

On the other hand, in recent years, a capacity of a main memory has increased. Further, an initialization time of the main memory has become a large part of the time needed for booting-up the computer. Therefore, the initialization time of the main memory should be shortened to reduce the boot-up time of the computer.

Patent Document 1 discloses a technique for accessing to an external storage device. In the technique, a flag circuit includes a flag corresponding to a memory region of the external storage device. The flag indicates whether data is written in the corresponding memory region. The flag circuit is initialized during a system booting. Therefore, it is confirmed whether the data is written in the memory region or not by setting or resetting the flag.

[Patent Document 1] Japanese Patent Application Laid-Open No. 5-324453.

SUMMARY OF THE INVENTION

According to one exemplary aspect of the present invention, an apparatus includes a first memory which includes a plurality of memory regions, a second memory which stores initializing information indicating whether each of the memory regions is initialized, and a control circuit which initializes a memory region based on the initializing information when accessing the memory region.

According to another exemplary aspect of the present invention, a circuit includes a first control circuit which controls a first memory including a plurality of memory regions, a second control circuit which controls a second memory that stores initializing information indicating whether each of the memory regions is initialized, and wherein the first control circuit which initializes a memory region based on the initializing information when accessing the memory region.

According to another exemplary aspect of the present invention, a method includes controlling a first memory including a plurality of memory regions, controlling a second memory that stores initializing information indicating whether each of the memory regions is initialized, and initializing a memory region based on the initializing information when accessing the memory region.

BRIEF DESCRIPTION OF THE DRAWINGS

Other exemplary aspects and advantages of the invention will be made more apparent by the following detailed description and the accompanying drawings, wherein:

FIG. 1 is a block diagram showing an example of a configuration of a memory controller 100 according to an exemplary embodiment of the present invention;

FIG. 2 is a block diagram showing an example of a configuration of a directory memory controller 12 of the memory controller 100;

FIG. 3 is a block diagram showing an example of a configuration of a main memory controller 11 of the memory controller 100;

FIG. 4 is a flowchart showing an example of an operation of the memory controller 100;

FIG. 5 is a flowchart showing an example of an operation of the memory controller 100.

DETAILED DESCRIPTION OF THE EXEMPLARY EMBODIMENTS

In the technique disclosed in the Patent Document 1, a process for setting the flag is required at the initialization on booting-up of the system, whereby it takes time to perform the process for setting the flag. Accordingly, the booting-up time of the computer is still not shortened. Also, a new storage area for storing the flag is required, thereby resulting in a drawback that a storage capacity is increased to store the flag.

In the present invention, the time for booting-up the computer is reduced without increasing the storage capacity for storing an information to be used for reducing the booting-up time.

According to one exemplary aspect of the present invention, an apparatus includes a first memory which includes a plurality of memory regions, a second memory which stores initializing information indicating whether each of the memory regions is initialized, the second memory controlling a coherency between the first memory and a cache memory, and a control circuit which initializes a memory region based on the initializing information when accessing the memory region.

According to another exemplary aspect of the present invention, the second memory selectively stores the initializing information and a control information to control the coherency between each of the memory regions and the cache memory.

According to another exemplary aspect of the present invention, the second memory selectively stores the initializing information and a control information to control the coherency between each of the memory regions and the cache memory, the second memory stores the initializing information in a vacant region of a storage portion for storing the control information.

According to another exemplary aspect of the present invention, the control information includes three kinds of information, the storage portion includes two bits, and the second memory stores the initializing information in the vacant region of the two bits.

According to another exemplary aspect of the present invention, a plurality of processors each of which include the cache memory, the second memory selectively stores the initializing information and a control information to control a coherency between each of the memory regions and a cache memory, the control information includes a first control information indicating that no data is stored in each of the cache memories, a second control information indicating that any one of the cache memories may store the data and a third control information indicating that any one of the cache memories or a plurality of the cache memories may store the data.

According to another exemplary aspect of the present invention, the initializing information indicates that the memory region is not initialized, an initialized state of the memory region is indicated by using the first, second or third information.

According to another exemplary aspect of the present invention, a second memory initializing circuit initializes the second memory when the apparatus is initialized.

According to another exemplary aspect of the present invention, the control circuit initializes the memory region without checking a data stored in the memory region if the initializing information indicates that the memory region is not initialized.

1. First Exemplary Embodiment

A first exemplary embodiment of the present invention will be described below with reference to FIGS. 1 to 5.

In the first exemplary embodiment, the computer includes a memory controller 100 to control a coherency by using a directory memory, for example.

Referring now to FIGS. 1-5, the memory controller 100 of the computer in this embodiment includes a memory control part 1, a main memory 2 to store predetermined data, and a directory memory 3 to store a caching state of the main memory 2. The caching state may indicate that a state of data which is stored to a cache memory from the main memory 2. The memory control part 1 controls the main memory 2 and the directory memory 3. The memory controller 100 includes a memory access requester 4 which issues a memory request to the memory control part 1 in accordance with a request from an upper-level host. The upper-level host may be a processor, for example. The memory control part 1 includes a main memory controller 11 which controls the main memory 2 and a directory memory controller 12 which controls the directory memory 3.

The main memory 2 may be partitioned into predetermined areas and managed according to the predetermined areas. The predetermined area may correspond to a unit of a data capacity which is stored in the cache memory of a CPU. The unit of the data capacity may be referred to as a "memory line". The data stored in the main memory 2 is stored to the cache memory according to the memory line. The caching state of each memory line is stored in the directory memory 3. Based on the caching state stored in the directory memory 3, the coherency is secured between the main memory 2 and the caches which are installed in a plurality of the CPUs.

Also, the main memory 2 is not initialized when the computer is booted-up. However, the main memory 2 is initialized by the main memory controller 11, if the applicable memory line is not initialized at the time of access to each memory line, as will be described later.

Also, the directory memory 3 stores the caching information representing the caching state of each memory line of the main memory 2 in the cache memory of the CPU. The directory memory 3 reserves two bits as an area for storing the caching information for each memory line. In the two bits, three states, "Invalid", "Private" and "Shared", for example, are stored as the caching information representing the caching state.

The "Invalid" state (first information) represents a state where data is not cached in any caches of each of the CPUs, and indicates that the memory line has the latest data in the main memory. The "Private" state (second information) represents a state where data may be cached in any one of the caches of each of the CPUs, and indicates that the memory line may not have the latest data in the main memory. The "Shared" state (third information) represents a state where data is possibly cached in one or more caches of each of the CPUs, and indicates that the memory line has the latest data in the main memory.

The two-bits area of the directory memory 3 prepared to store the caching information for each memory line of the main memory 2 is able to hold information indicating four states. That is, by using two bits of information, it is capable to express four kinds of information, (i.e., "00", "01", "10" and "11"). On the other hand, since the above caching information is information representing three states, information representing one more state can be additionally stored. That is, one state of the two-bits information representation is empty and thus one more information may be assigned thereto.

Thus, in the present invention, the empty state is used to further store "non-initialization information" representing a non-initialized state where each of the memory lines of the main memory 2 is not initialized. In the present invention, the "Invalid", "Private" and "Shared" may be used as information representing that each of the memory lines of the main memory 2 is "initialized". Thus, in the present invention, the two-bits area is used to represent that the memory line is either "non-initialized" or "initialized", and more specifically used to represent four states of "non-initialized", "Invalid", "Shared" and "Private". In the present invention, the initialization information is stored with the caching information in the two-bits area of the directory memory 3.

The memory access requester 4 generates a data write request into the main memory 2, or a data read request from the main memory 2, in accordance with a request from the upper-level host. The generated request is issued to each of the main memory controller 11 and the directory memory controller 12. Also, the memory access requestor 4 accepts data read from the main memory 2 in the main memory controller 11.

Figure 2:
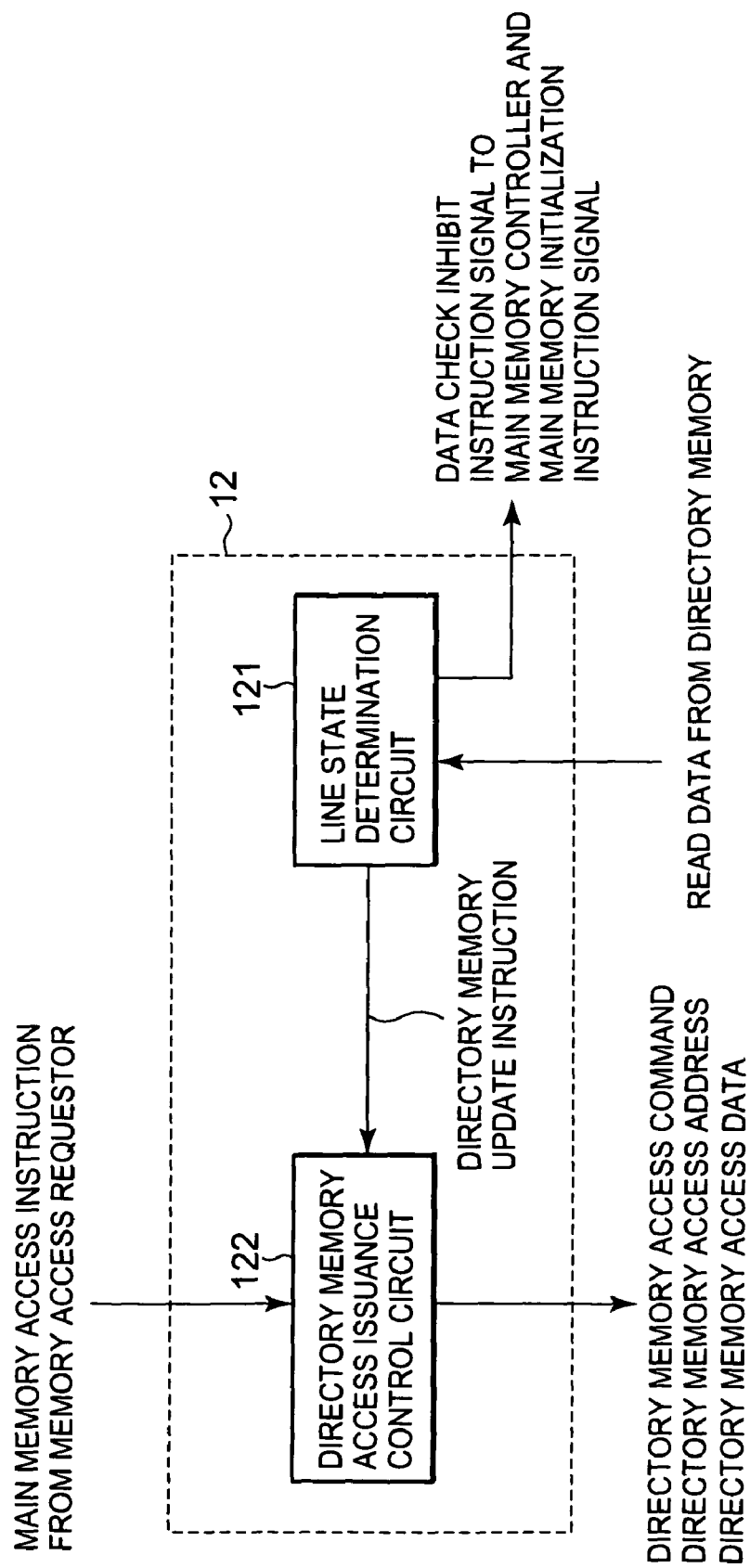

Next, the configuration of the directory memory controller 12 will be described below in detail. The directory memory controller 12 includes a line state determination circuit 121 and a directory memory access issuance control circuit 122, as shown in FIG. 2. Each of these control circuits 121 and 122 may be realized by hardware, or by each control circuit program being executed.

The directory memory access issuance control circuit 122 accepts a memory access from the memory access requester 4, and issues a directory memory access command to the directory memory 3 which includes an area storing the caching information in the corresponding memory line of the main memory 2. Read data from the directory memory 3 is inputted into the line state determination circuit 121.

Then, the line state determination circuit 121 sends a "data check inhibit instruction signal" to a data check circuit 111 of the main memory controller 11, and sends a "main memory initialization instruction signal" to a main memory initialization data generation circuit 112, if the line memory corresponding to the memory access is not initialized. In addition, the line state determination circuit 121 issues a "directory memory update instruction" to the directory memory access issuance control circuit 122. On the other hand, the line state determination circuit 121 does not perform the above operation if the memory line corresponding to the memory access is initialized, whereby the cache coherence control is performed.

The directory memory access issuance control circuit 122 operates to initialize the directory memory 3 on booting-up the computer or the memory controller. And, the initialized directory memory 3 stores information representing whether each of the memory lines is in the state of "non-initialized".

Figure 3:
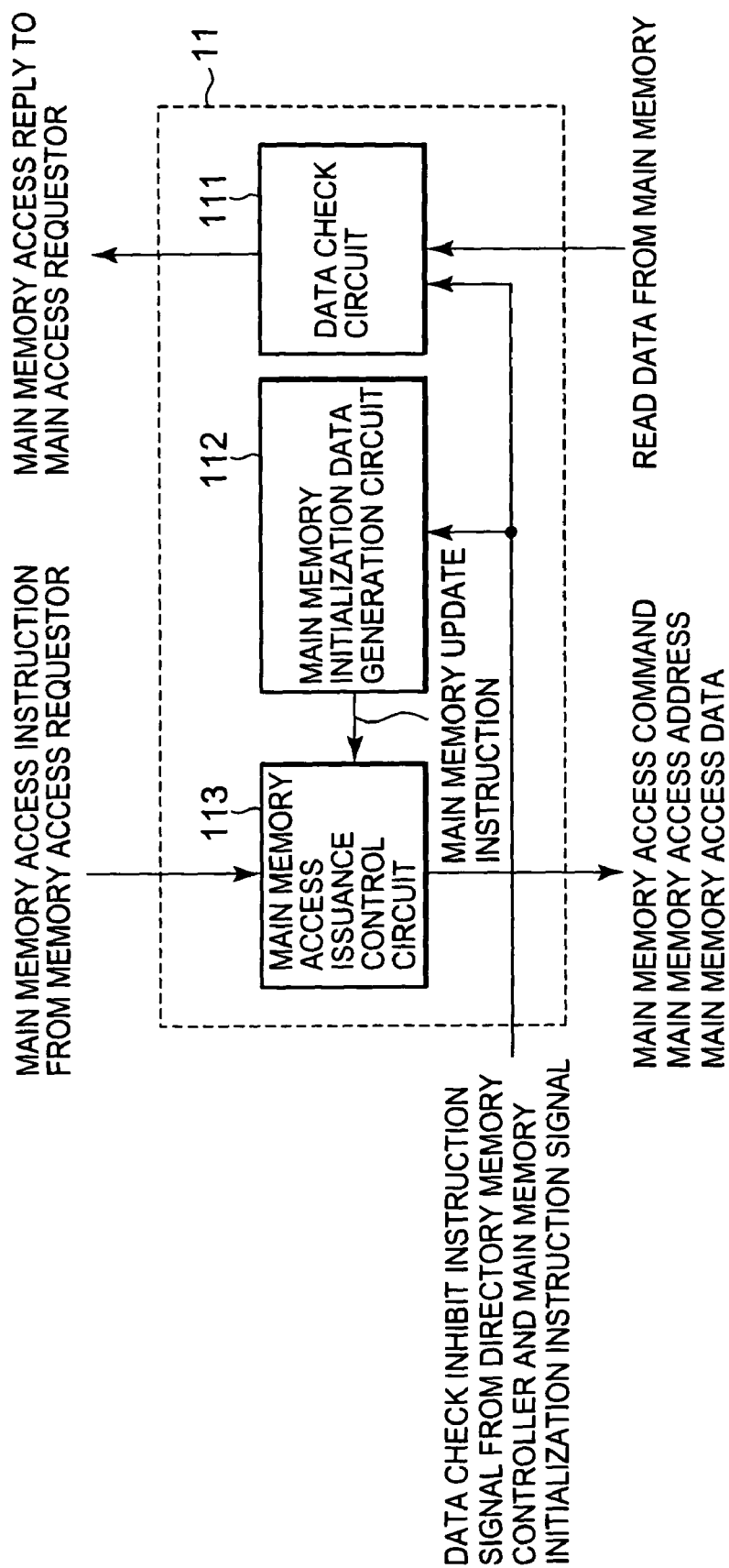

The main memory controller 11 includes a data check circuit 111, a main memory initialization data generation circuit 112, and a main memory access issuance control circuit 113, as shown in FIG. 3. Each of these control circuits 111, 112 and 113 may be realized by hardware, or by each control circuit program being executed.

The main memory access issuance control circuit 113 accepts the memory access from the memory access requester 4, and issues an access command to the main memory 2. If the memory access is for reading the data from the main memory, then read data which is read from the main memory 2 upon the memory access is checked in the data check circuit 111. The data check circuit 111 checks the read data to return the checked read data to the memory access requestor 4.

The data check circuit 111 does not perform the data check, when receiving a "data check inhibit instruction signal" from the line state determination circuit 121 of the directory memory controller 12. Also, the main memory controller 11 includes the main memory initialization data generation circuit 112 described above. The main memory initialization data generation circuit 112 receives a "main memory initialization instruction signal" from the line state determination circuit 121 of the directory memory controller 12, if the memory line to be accessed is not initialized.

In response to "main memory initialization instruction signal", the main memory initialization data generation circuit 112 generates initialization data including correct check data, and sends a "main memory update instruction signal" to the main memory access issuance control circuit 113 to instruct writing the initialization data in the main memory. Then the main memory access control circuit 113 writes the initialization data in the memory line corresponding to the memory access in accordance with a main memory update instruction, and accesses the memory in accordance with an instruction from the memory access requester 4.

Thus, in the present invention, it is judged whether the memory line of the main memory 2 to be accessed is already initialized by searching the directory memory 3. If the memory line is not initialized, then memory line is initialized for the first time by inhibiting the check for the read data from the main memory. Thereby, the initialization of the main memory on booting-up of the computer may be omitted to shorten the booting-up time of the computer.

Figure 4:
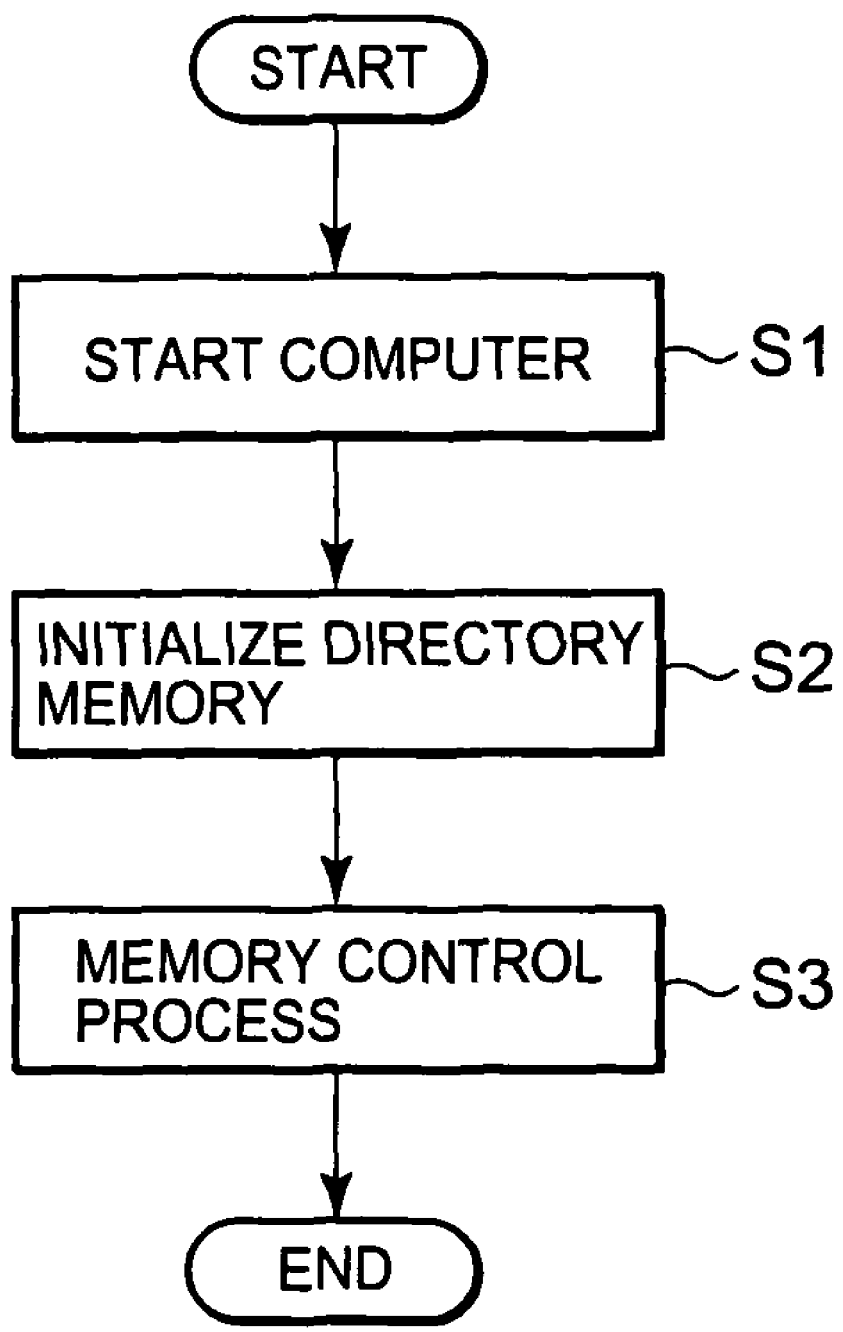
Figure 5:
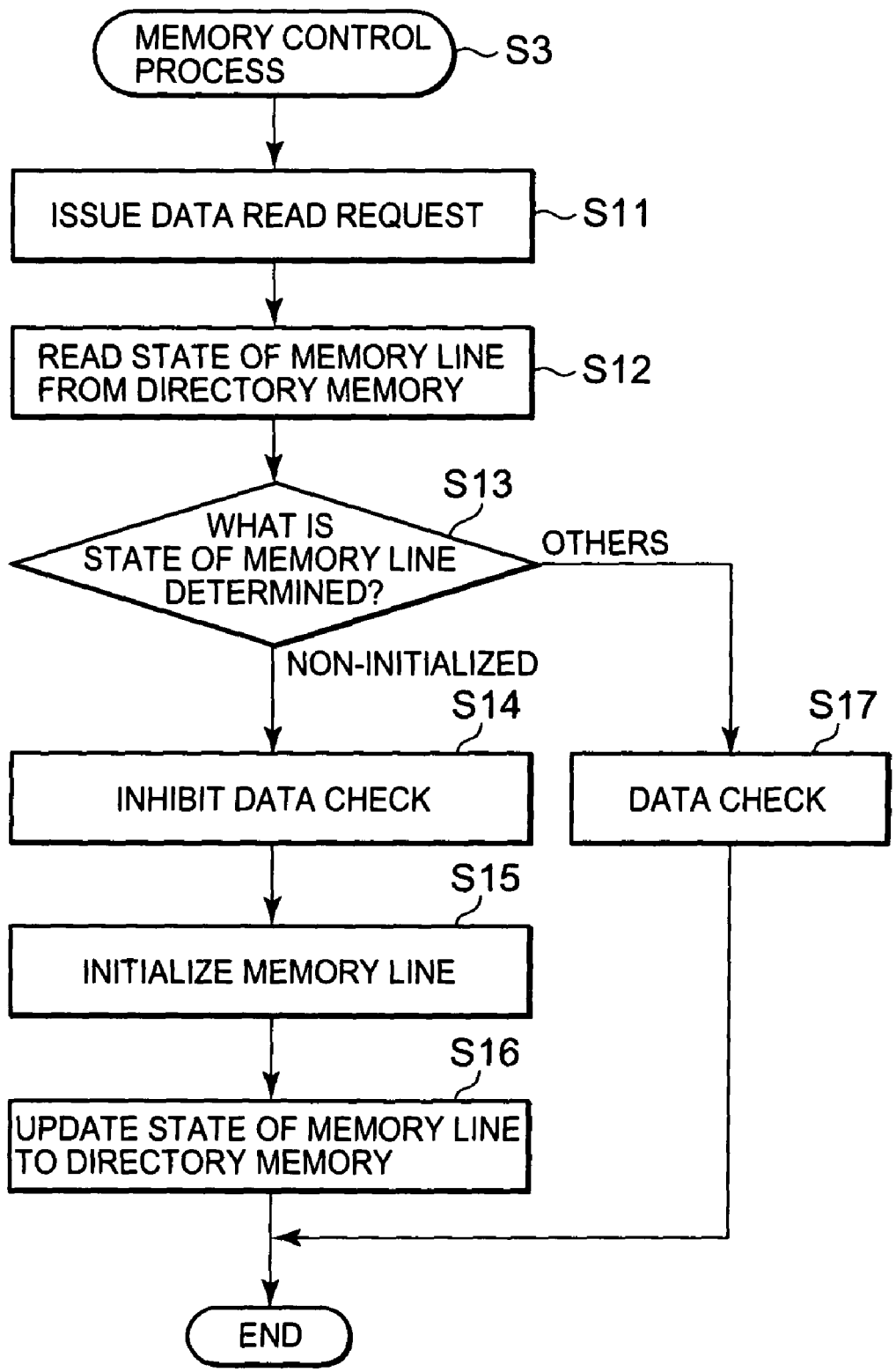

Referring to FIGS. 4 and 5, an exemplary operation of the invention is described below. The computer is started (step S1) without initializing the main memory 2. Then, the directory memory 3 is initialized (step S2). A state where the directory memory 3 is initialized indicates that each of corresponding memory lines of the main memory 2 is "non-initialized". In other words, when the directory memory 3 is initialized, the information indicating that the main memory 2 is not initialized is stored in the directory memory 3.

Then, the exemplary operation proceeds to the control of the main memory 2 (step S3). When accessing the main memory 2, the memory access requester 4 generates a data write request into the main memory 2 or a data read request from the main memory 2, and issues the requests to the memory control part 1. In FIG. 5, the exemplary operation when the data read request is generated is described.

The memory access requester 4 issues a data read request (step S1). The data read request is inputted into the main memory access issuance control circuit 113 of the main memory controller 11 and the directory memory access issuance control circuit 122 of the directory memory controller 12. A read instruction of the memory line corresponding to the data read request is issued to the main memory 2 and the directory memory 3. The information of the state of the memory line is read from the directory memory 3 (step S12). The read information is inputted into the line state determination circuit 121 to determine the state of the memory line (step S13). In other words, the initialized state or the caching state of the memory line to be accessed is discriminated.

If the line state determination circuit 121 determines that the memory line to be accessed is not initialized ("Non-initialized" in Step S13), then the line state determination circuit 121 sends a data check inhibit instruction signal to the data check circuit 111 of the main memory controller 11. The data check circuit 111 receives the data check inhibit instruction signal and invalidates the check for the read data from the main memory 2 (step S14). The data check circuit 111 returns data in which all bits are "0" as a reply to the data read request to the memory access requester 4.

Also, if the line state determination circuit 121 determines that the memory line is not initialized, the line state determination circuit 121 sends a main memory initialization instruction signal to the main memory initialization data generation circuit 112. When the main memory initialization data generation circuit 112 receives the main memory initialization instruction signal, the main memory initialization data generation circuit 112 generates data in which all bits are "0" and check data adaptable to the generated data. The main memory initialization data generation circuit 112 sends a main memory update instruction to the main memory access issuance control circuit 113. As the check data, an ECC (Error Correcting Code) or parity may be employed. Then, the main memory access issuance control circuit 113 updates data in the memory line in accordance with the main memory update instruction for initializing the memory line (step S15).

If the line state determination circuit 121 of the directory memory controller 12 determines that the memory line is not initialized (in step S13), the line state determination circuit 121 sends a directory memory update instruction to the directory memory access issuance control circuit 122 so that the main memory 122 may be in any of the states "Invalid", "Shared" and "Private" in accordance with the kind of request from the memory access requester 4. The directory memory access issuance control circuit 122 updates the state of the line of the directory memory 3 in accordance with the directory memory update instruction (step S16).

On the other hand, if the line state determination circuit 121 determines that the memory line to be accessed is in the initialized state of any of "Invalid", "Shared" and "Private" (step S17), the data check circuit 111 checks the data which is read from the main memory 2 for controlling the coherency of the cache.

In the related art, on booting-up of a computer, an initialization operation of writing data in which all bits are 0 and the check data adaptable to it into all the memory lines of the main memory is performed.

On the other hand, in the present invention, the initialization of the main memory 2 on booting-up is omitted. And, it is judged whether or not the corresponding memory line of the main memory 2 is already initialized depending on the state of the directory memory when accessing the main memory after booting-up. If the memory line is not initialized, then the check for read data is inhibited, and the memory line of the main memory is initialized at the time. Accordingly, the booting-up time of the computer becomes shorter.

Also, the initialized state of the main memory is stored by using the directory memory which is already installed. Since three states of the memory line stored within the directory memory are represented in two bits, even if the non-initialized state of the main memory is newly added, four states may still be represented in two bits. Accordingly, the booting-up time of the computer may be shortened without increasing the capacity of the directory memory.

Even in the case where the main memory and the directory memory are not physically separated, but combined in the same memory as described above, the booting-up time may be shortened by initializing only the directory memory area on booting-up of the computer, whereby the invention is effective.

While the present invention have been described with reference to the accompanying drawings, it is to be understood that modifications will be apparent to those skilled in the art without departing the spirit of the invention.

Further, it is noted that Applicant's intent is to encompass equivalents of all claim elements, even if amended later during prosecution.

What is claimed is:

1. An apparatus, comprising:
    a first memory which includes a plurality of memory regions;
    a second memory which stores initializing information indicating whether each of the memory regions is initialized, the second memory controlling a coherency between the first memory and a cache memory; and
    a control circuit which initializes a memory region based on the initializing information when accessing the memory region.

2. The apparatus according to claim 1, wherein the second memory selectively stores the initializing information and a control information to control the coherency between each of the memory regions and the cache memory.

3. The apparatus according to claim 1, wherein the second memory selectively stores the initializing information and a control information to control the coherency between each of the memory regions and the cache memory, and
    wherein the second memory stores the initializing information in a vacant region of a storage portion for storing the control information.

4. The apparatus according to claim 3, wherein the control information includes three kinds of information,
    wherein the storage portion comprises two bits, and
    wherein the second memory stores the initializing information in vacant region of the two bits.

5. The apparatus according to claim 1, further comprising:
    a plurality of processors each of which includes the cache memory,
    wherein the second memory selectively stores the initializing information and a control information to control a coherency between each of the memory regions and a cache memory, and
    wherein the control information includes any of a first control information indicating that no data is stored in each of the cache memories, a second control information indicating that any one of the cache memories may store the data, and a third control information indicating that any one of the cache memories or a plurality of the cache memories may store the data.

6. The apparatus according to claim 5, wherein the initializing information indicates that the memory region is not initialized, and
    wherein an initialized state of the memory region is indicated by using the first, second or third information.

7. The apparatus according to claim 1, further comprising:
    a second memory initializing circuit which initializes the second memory when the apparatus is initialized.

8. The apparatus according to claim 1, wherein the control circuit initializes the memory region without checking a data stored in the memory region if the initializing information indicates that the memory region is not initialized.

9. A circuit, comprising:
    a first control circuit which controls a first memory including a plurality of memory regions;
    a second control circuit which controls a second memory that stores initializing information indicating whether each of the memory regions is initialized, the second memory controlling a coherency between the first memory and a cache memory; and
    wherein the first control circuit which initializes a memory region based on the initializing information when accessing the memory region.

10. A method, comprising:
    controlling a first memory including a plurality of memory regions;
    controlling a second memory that stores initializing information indicating whether each of the memory regions is initialized, the second memory controlling a coherency between the first memory and a cache memory; and
    initializing a memory region based on the initializing information when accessing the memory region.

11. The method according to claim 10, further comprising:
    selectively storing the initializing information in the second memory and a control information to control the coherency between each of the memory regions and the cache memory.

12. The method according to claim 10, further comprising:
    selectively storing the initializing information in the second memory and a control information to control the coherency between each of the memory regions and the cache memory; and
    storing the initializing information in a vacant region of a storage portion for storing the control information.

13. The method according to claim 12, wherein the control information includes three kinds of information;
    wherein the storage portion comprises two bits, said method further comprising:
    storing the initializing information in the vacant region of the two bits.

14. The method according to claim 10, further comprising:
    initializing the second memory when an apparatus, which includes the first memory and the second memory, is initialized.

15. The method according to claim 10, further comprising:
    initializing the memory region without checking a data stored in the memory region if the initializing information indicates that the memory region is not initialized.

* * * * *